United States Patent
Wezelenburg

(10) Patent No.: US 7,630,388 B2
(45) Date of Patent: Dec. 8, 2009

(54) SOFTWARE DEFINED FIFO MEMORY FOR STORING A SET OF DATA FROM A STREAM OF SOURCE DATA

(75) Inventor: Martinus Cornelis Wezelenburg, Leuven (BE)

(73) Assignee: ARM Limited, Cambridge (GB)

( * ) Notice: Subject to any disclaimer, the term of this patent is extended or adjusted under 35 U.S.C. 154(b) by 622 days.

(21) Appl. No.: 11/121,185

(22) Filed: May 4, 2005

(65) Prior Publication Data

US 2006/0253649 A1    Nov. 9, 2006

(51) Int. Cl.
*H04L 12/56* (2006.01)
*G06F 3/00* (2006.01)

(52) U.S. Cl. .............................. 370/412; 710/52; 710/58
(58) Field of Classification Search ................. 370/412, 370/415, 419; 710/52–54, 58, 59, 61
See application file for complete search history.

(56) References Cited

U.S. PATENT DOCUMENTS

| | | | |
|---|---|---|---|
| 5,440,740 A | | 8/1995 | Chen et al. |
| 5,602,995 A | * | 2/1997 | Hendel et al. ............... 711/209 |
| 5,623,619 A | * | 4/1997 | Witt .............................. 711/3 |
| 5,748,468 A | | 5/1998 | Notenboom et al. |
| 5,752,069 A | * | 5/1998 | Roberts et al. ................ 712/23 |
| 5,860,104 A | * | 1/1999 | Witt et al. .................... 711/137 |
| 6,055,579 A | | 4/2000 | Goyal et al. |
| 6,574,273 B1 | | 6/2003 | Luna et al. |
| 6,625,639 B1 | | 9/2003 | Miller et al. |
| 6,625,654 B1 | | 9/2003 | Wolrich et al. |
| 6,643,716 B2 | * | 11/2003 | Hunsaker et al. ............ 370/466 |
| 6,934,951 B2 | | 8/2005 | Wilkinson, III et al. |
| 6,983,350 B1 | | 1/2006 | Wheeler et al. |
| 6,999,994 B1 | | 2/2006 | Benayoun et al. |
| 7,233,331 B2 | | 6/2007 | Kato |

(Continued)

FOREIGN PATENT DOCUMENTS

DE    103 23 189    12/2004

(Continued)

OTHER PUBLICATIONS

H. Igura et al, "An 800-MOPS, 11-mW, 1.5-V, Parallel DSP for Mobile Multimedia Processing" *IEEE Journal of Solid-State Circuits*, vol. 33, No. 11, Nov. 1998, pp. 1820-1828.

(Continued)

*Primary Examiner*—Aung S Moe
*Assistant Examiner*—Kerri M Rose
(74) *Attorney, Agent, or Firm*—Nixon & Vanderhye

(57) ABSTRACT

A local FIFO memory 2 is provided within a local RAM memory 4 to provide access to source data values. A local controller 10 manages the asynchronous fetching of source data values to the local FIFO memory 2 and the optional writing back of these data values after processing to a source/sync memory 32. One or more local head pointers and one or more local tail pointers are used by the local memory controller 10 to manage storage within the local FIFO memory 2 which is configured as a circular buffer; The remaining space within the local RAM 4 may be used for further data and the partitioning between FIFO operation and further data storage is programmable such that the same memory storage 2 can be used for multiple purposes as required.

28 Claims, 5 Drawing Sheets

U.S. PATENT DOCUMENTS

| | | |
|---|---|---|
| 7,389,508 B2 | 6/2008 | Aguilar et al. |
| 7,478,390 B2 | 1/2009 | Brokenshire et al. |
| 2004/0025159 A1 | 2/2004 | Scheuermann et al. |
| 2005/0036557 A1 | 2/2005 | Balakrishnan et al. |
| 2005/0122986 A1 | 6/2005 | Starr et al. |

FOREIGN PATENT DOCUMENTS

| | | |
|---|---|---|
| EP | 0 945 788 | 9/1999 |
| JP | 11-272631 | 10/1999 |

OTHER PUBLICATIONS

J. Watlington et al, "A System for Parallel Media Processing" *Parallel Computing*, vol. 23, No. 12, 1997, pp. 1793-1809.

English translation of Official Action mailed Dec. 2, 2008 in corresponding Japanese Application No. 2006-124134.

PCT International Search Report mailed Jul. 26, 2006.

* cited by examiner

SOFTWARE DEFINED FIFO MEMORY FOR STORING A SET OF DATA FROM A STREAM OF SOURCE DATA

CROSS REFERENCE TO RELATED APPLICATIONS

The following co-pending Continuation-in-Part U.S. applications/patents are commonly owned and herein incorporated by reference:

Related U.S. patent application Ser. No. 11/402,192, filed Apr. 12, 2006, Matterne et al.

Related U.S. patent application Ser. No. 11/403,201, filed Apr. 13, 2006, Wezelenburg et al.

BACKGROUND OF THE INVENTION

1. Field of the Invention

This invention relates to the field of data processing, data transport and data management systems. More particularly, this invention relates to data processing systems which require sequential and local out-of-order access to data values from within a stream of data values.

2. Description of the Prior Art

It is known to provide data processing systems with cache memories to provide local and fast access to frequently used data values. Such cache memories have considerable flexibility in that individual cache rows may typically be mapped to separate areas within the overall memory address space. This flexibility brings with it an associated overhead in terms of circuit complexity and control. Furthermore, cache memories are typically primarily reactive in that, when new data is to be accessed, a cache miss will occur resulting in that data being fetched into the cache memory whereupon it may subsequently be more rapidly accessed.

It is also known to provide data processing systems which need to access data values from within a stream of data values in a relatively predictable manner. Examples of such systems would be ones processing a stream of audio data which is encoded in a known format and which will be accessed in a regular sequence. Another example would be a system for processing a stream of video data in which the images occur in a sequence and are encoded in accordance with a known format which is processed in a regular sequence. It is desirable to provide local high speed access to such streamed data. A generic cache memory used for this purpose would however bring with it a significant amount of associated circuit overhead and complexity which was not necessary since the accessing of the stream data is relatively predictable. Furthermore, traditional cache memories operate on a reactive basis and thus cache misses would occur as new portions of the stream data needed to be accessed with a resulting disadvantageous delay whilst a cache fill took place.

SUMMARY OF THE INVENTION

Viewed from one aspect the present invention provides apparatus for controlling transfer and storage of data, said apparatus comprising:

a streaming interface to a source of data values to be processed, said data values being ordered in accordance with a predetermined source data sequence and having respective associated source addresses in a source data linear address map;

a local FIFO memory coupled to said source and operable to store a set of data values corresponding to data values from said source and extending within said local FIFO memory from a local head address to a local tail address;

a data processing unit coupled to said local FIFO memory and operable to issue an access request to a target data value stored at a source address within said source, wherein if said target data value is within said set of data values stored within said local FIFO memory, then said target data value is accessed by said data processing unit from said local FIFO memory rather than said source; and a memory controller coupled to said source and said local FIFO memory and operable asynchronously with accesses by said data processing unit to said local memory to change at least said local head address to trigger movement of data values between said source and said local FIFO memory so as to provide storage within said local FIFO memory of data values to be accessed by said data processing unit.

The present technique recognises that a local first-in-first-out (FIFO) memory may be used to provide a window into the data stream which is locally stored and accordingly may be subject to more rapid and efficient access. The access may be read only access, but it is also possible that write access may be provided to the data within the local FIFO memory. The memory controller is operable to asynchronously manage the filling and draining of the local FIFO memory in response to a change in at least one of the local head address and the local tail address within the local FIFO memory. It will be appreciated that the source addresses may be virtual addresses, timestamps or other ways of identifying a position within the source data. The local head address and the local tail address are physical addresses associated with the local FIFO memory and are used in the management of that local FIFO memory by the memory controller, but otherwise do not need to be known to the data processing unit seeking to access the data values. The local head address and local tail address may be programmable so that they can be set up under control of the data processing unit or other elements as a static process separate from the running and use of the system in the streaming mode, but alternatively the local head address and local tail address may be completely managed by the memory controller. A plurality of tail pointers and split tail pointers and split tail pointers (splitting is in general required when there is a pipeline present) may be provided.

The memory controller may conveniently use direct memory access units to move data between the local FIFO memory and the source in one or both directions. Direct memory access units are typically often already provided within such systems and may be re-used for this purpose, to which they are well suited. In particular, direct memory access units may be set to operate in a continuous mode whereby they seek to stream data into the local FIFO memory as it indicates it is able to accept such data.

It will be appreciated that whilst the local FIFO memory could store a single set of data values to be accessed, it is also possible that multiple sets of data values may be stored, e.g. corresponding to multiple lines within an image which are required to be accessed together to perform operations such as image filtering. A single FIFO instances may be logically divided to act as multiple local FIFOs with respective head and tail pointers if so desired.

The present technique has utility in enabling a reduction in the amount of data storage required since the local FIFO memory stores only a portion of the source data and yet gives the functionality to the data processing unit of being able to access any source data. In addition, since the FIFO is software defined, the memory space it occupies can be fully reclaimed when the tasks on the data processing unit are swapped. The advantages of the invention are however particularly strong when the accesses to the local FIFO memory are quicker than accesses directly to the source of the data values.

The local FIFO memory may optionally be provided as part of a local RAM memory which is operable to store further data values independent of the set of data values. The provision of the local FIFO memory as part of a more generic local RAM memory enables reuse of its storage capabilities for other purposes when not required to support streaming activities such as are described above.

The partitioning of the local RAM memory to support both types of data storage may be provided with a programmable partition between contiguous regions of the local RAM memory.

When the system stores data originating from, or consumed by multiple source and sink devices it is desirable to provide an arbiter which is able to arbitrate between memory accesses to the different types of data being stored, such that the loss of data is avoided, and in the case of high-speed concurrent transfers appropriate access priorities may be given.

The local FIFO memory is advantageously arranged as a circular buffer with the local head address and local tail address being used to indicate the start and stop of the locally stored set of data values and wrapping around the ends of the local FIFO memory as appropriate. This avoids unnecessary movement and copying of data values once they have been placed into the local FIFO memory.

As previously mentioned, the local head address and local tail address may be stored within programmable registers within the local memory controller. The local tail address may be set by the data processing unit writing to its associated register. The writing to the local tail address register can be used to indicate that some data has been consumed and is no longer needed. In this circumstance, the memory controller can be responsive to such a change to exploit vacated space within the local FIFO memory and fill this with new data values copied from the source. This removes the overhead of filling the local FIFO memory from other circuit elements.

As previously mentioned, data values being removed from the local FIFO memory could merely be discarded, or alternatively may be copied back to the source. Such copying back would be appropriate in circumstances such as filtering of the data in which the data is accessed and modified into a new form which is required later.

In order to deal efficiently with overflows, the local FIFO memory may be provided with a spill memory area into which data values can be stored when an overflow occurs. This is particularly useful in enabling data values which are already in transit between the source and the local FIFO memory to be safely stored and not lost when the local FIFO memory is a slave device. The overflow/spilling would typically occur when an application running on the data processing unit is finished (with a frame of data), whilst its output (frame of data) is weakly related to the bit-stream) input of the data processing unit. In that case the DMA slave FIFO input is simply stopped, because the program is finished. This is, for example, the case with audio streams: a certain section is one-to-one associated with the output frame, but is globally unknown where this section resides in the stream.

When an underflow of data within the local FIFO memory occurs, then the data processing unit may be stalled awaiting a required data value.

As well as manually moving the local tail pointer with an explicit write to an appropriate register, it may be convenient to provide the data processing unit with a mode of operation in which when it reads a data value from the set of data values then this also serves to remove that data value from the local FIFO memory with an appropriate change in local tail address.

The present technique is well suited to embodiments in which the data processing unit performs data processing operations upon a number of data values located in relatively close proximity within the data stream such that this plurality of data values may all be held simultaneously within the local FIFO memory and available for rapid access.

The type of data values being manipulated could take a wide variety of forms, but typically these include audio data values and video data values which may be subject to one or more of a filtering operation, a decoding operation, an encoding operation, a compression operation and/or a decompression operation.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
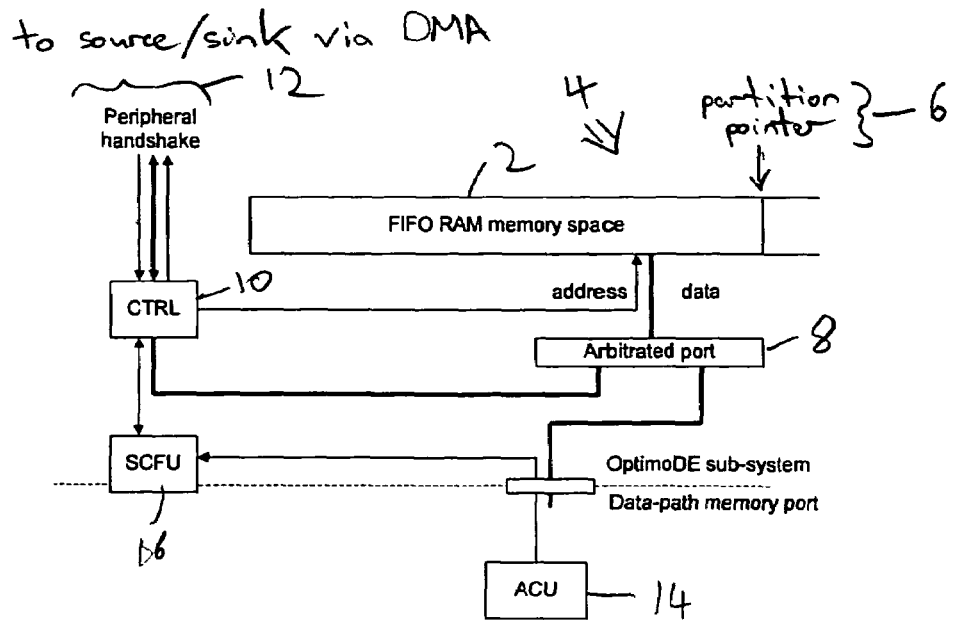
FIG. 1 illustrates a first example embodiment of a local FIFO memory in accordance with the present technique.

FIG. 1 illustrates a local FIFO memory 2 formed as part of a local RAM memory 4. A partition pointer 6, which is programmable via a register, divides the local RAM memory into the local FIFO memory 2 and a further portion for storing further data not related to the action of the local FIFO memory 2. The provision of the local FIFO memory 2 within the more general purpose local RAM memory 4 enables reuse of the same memory resource and by programming the partition pointer 6 as desired more or less storage can be made available for the further data stored within the local RAM memory 4.

An arbiter 8 serves to arbitrate between access requests which are received from more than one source or sink into the local RAM memory 4. As an example, a memory controller 10 may serve to perform maintenance operations upon the local FIFO memory 2 so as to maintain it as a window into a larger stream of source data asynchronously to data processing operations being performed which consume or otherwise manipulate that data within the FIFO memory 2, as well as other data processing operations which may access further data within the local RAM memory 4.

The local memory controller 10 has a source/sink interface 12 to a source of data values and/or a sync of data values. It will be appreciated that the source and sink of data values may be a common memory or may be separate memories. The interface 12 to these source and sink values is in this example a common bus interface and may pass via a direct memory access unit (not illustrated) which serves to be responsible for completing memory transfers. The local memory controller is a DMA slave (hence the overflow functionality), which simply handshakes with the system. The data within the source or sink is typically stream data, such as audio or video data, which it is desired to process in accordance with a technique such as filtering, decoding, encoding, compression or decompression. Such processing typically proceeds in a sequence through a stream of data, possibly processing a particular data value in conjunction with one or more neighbouring or near neighbouring data values within the stream. Thus, whilst the whole, and typically very large, data stream may eventually be processed, at any given time only a relatively small amount of data is active and needs to be accessed. The local FIFO memory 2 provides local storage of this set of active data such that it may be rapidly and efficiently accessed either in random access order by the data processing units, where the locally explicitly generated logical addresses are automatically translated to the corresponding FIFO physical addresses, or as a pure FIFO, over the SCFU 16 interface, in which case no address needs to be provided as the SCFU keeps track of the FIFO. However, dependent on the (automatic) update of the tail pointer, the SCFU can be issued a rewind( ) instruction, as long as the stream data is still in the FIFO. The data processing units themselves issue requests for access to data values within the source data and are unaware of the action of the local FIFO memory and the local memory controller 10 in keeping a local high speed copy of the relevant portion of the stream of data within the local FIFO memory 2. The physical addresses within the local FIFO memory 2 are managed by the local memory controller 10 as is appropriate translation between addresses generated by the data processing unit in the source or sync data and the local physical addresses within the local FIFO memory 2.

In the embodiment of FIG. 1, an address calculation unit 14 serves to generate a sequence of addresses for source data values to be accessed, defined in the logical data address space, and these are passed via an interface unit 16 to the local memory controller 10 where they are translated as necessary into local physical addresses within the local FIFO memory 2 before the data is returned via the data path and the arbitration port 8. If the source data value to which an access attempt is being made is not present within the local FIFO memory 2, then the data processing unit requesting that access is stalled until the local memory controller 10 can satisfy that request by an appropriate fill to the local FIFO memory 2.

Figure 2:
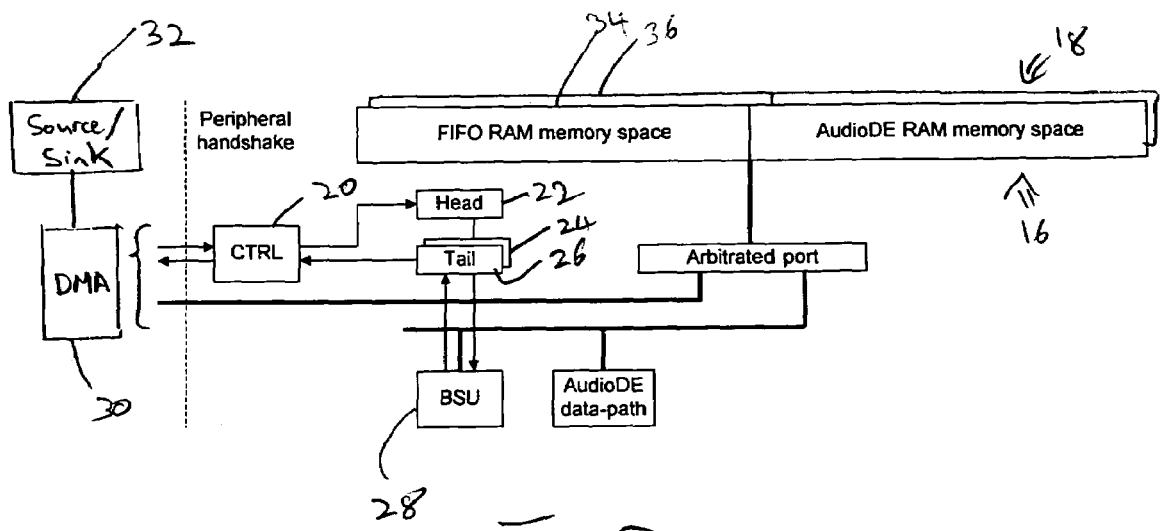
FIG. 2 illustrates a second example embodiment of a local FIFO memory in accordance with the present technique.

FIG. 2 illustrates a second embodiment of the present technique. In this embodiment, multiple local RAM memories 16, 18 are provided and are managed by the local memory controller 20. Explicitly shown within this example embodiment are registers storing a local head address value 22 and two local tail address values 24, 26. These local head and tail addresses 22, 24, 26 may be programmed as part of a static setup operation of the local FIFO memories using a bit stream unit 28 (more generically a SCFU, system call functional unit, providing an interface for all interactions with the asynchronous external world in this example. Once configured and set up, the local head address 22 is used by the local memory controller 20 to control the point at which new source data values are written to when recovered via a DMA unit 30 from a common source/sync memory 32. The local tail addresses are controlled by the bit stream unit 28 which serves to advance these when the data values at these tail positions are no longer required so as to free space within the local FIFO memories 34, 36 for the storage of new data values. The memory controller 20 is responsible for noting the availability of free space to allow the local header address to be advanced and then asynchronously performing the required fetch operations via the DMA 30 from the common source/sync memory 32. The local FIFO memories 34, 36, 2 are formed as circular buffer memories (ring buffers) in which the local head address and local tail address define the beginning and end of the data being stored and wrap around the ends of the memory address space available in the conventional manner for a circular buffer. Thus, once written into the local FIFO memory 34, 36, 2, individual data values need not be moved until they are either written back to the source/sink memory or discarded.

Figure 3:
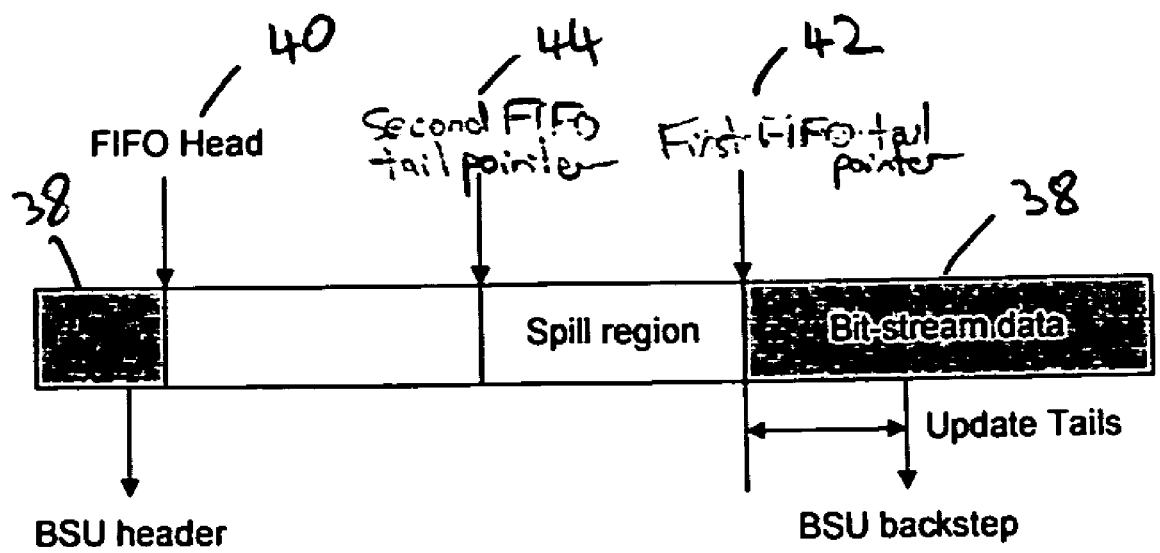
FIG. 3 illustrates the relationship between different regions within the local FIFO memory and the various pointers managed by the local memory controller for the example situation where an ongoing transfer can be aborted.

FIG. 3 illustrates a portion of a stream of source data values stored within a local FIFO memory. This bit-stream data 38 extends from a local head address 40 to a local tail address 42. There is a further local tail address 44 which defines a spill region between the further local tail address 44 and the local tail address 42 into which overflow data may be written as will be described later. The local head address and local tail addresses 40, 42, 44 advance through the local FIFO memory physical address space with wrapping at the ends of this address space to provide a circular buffer operation. A bit stream unit 28 serves to maintain its own head pointer and tail pointer indicating the active area within the locally stored bit stream 38 upon which it is performing processing. During normal operations the split tail pointers 42 and 44 are moved in concert, keeping a constant size spill region, because the head pointer 40 cannot cross the second tail pointer 44. When the data processing unit stops its main program, the second tail pointer 44 can be unlocked, such that the head pointer can advance until pointer 42, and thus write any remaining data in transit. There is no protection against the case when this data would exceed the spill region. However, since the system programmer can define the low-level DMA transfer size, and is responsible for the high level system synchronisation, in a well programmed system, the required size for this region can be determined deterministically as a function of the DMA transfer chunk size and the bus transfer queue depth.

Figure 4:
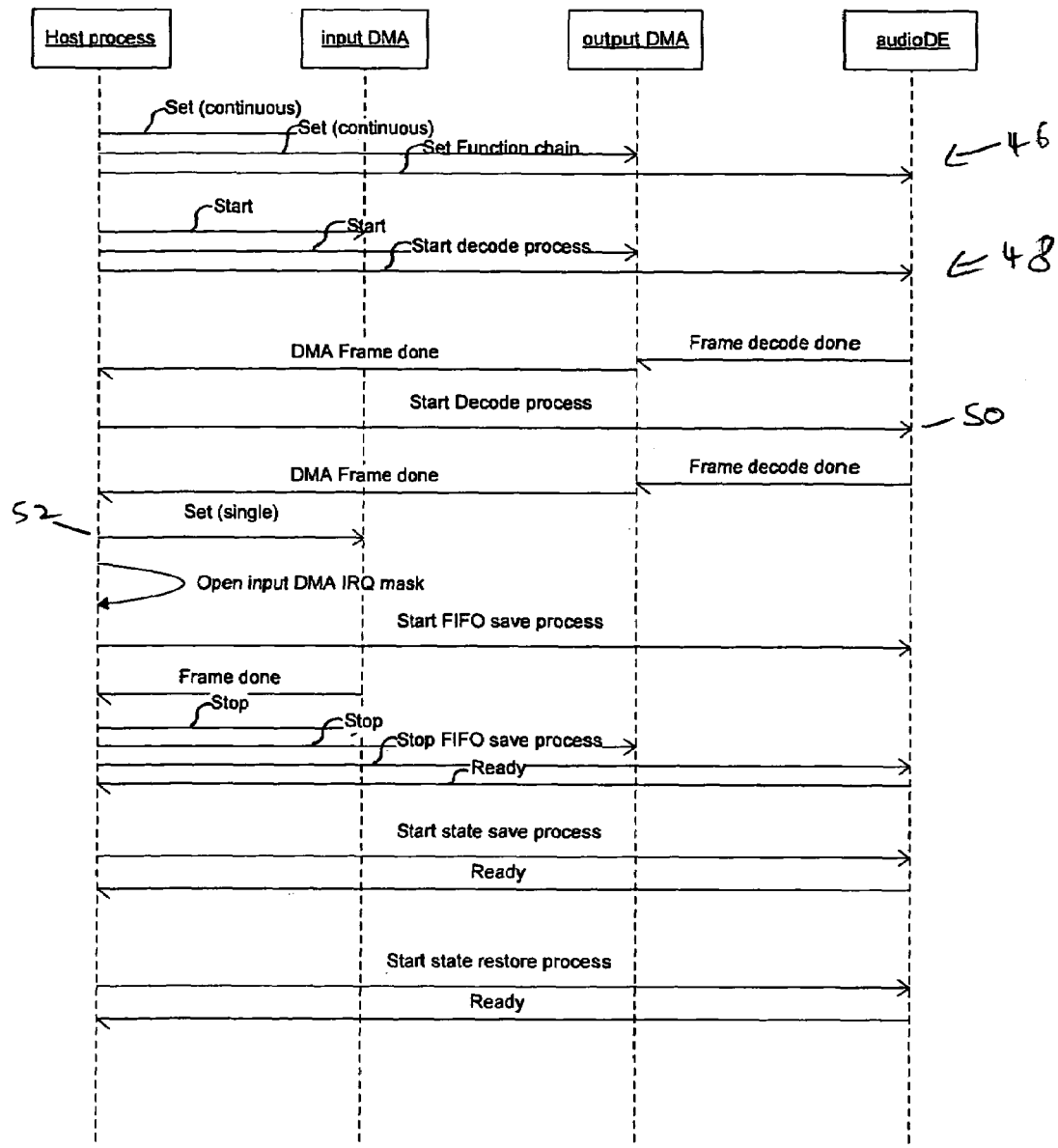
FIG. 4 illustrates control of the starting and stopping of the streaming of data into a local FIFO memory.

FIG. 4 schematically illustrates the starting, streaming and stopping of data transfer between a source memory and a local FIFO memory when using the split FIFO tail pointer spill region illustrated in FIG. 3. At the first two sequences of steps 46, 48, the input DMA, output DMA and consuming data processing unit are each initialised and then started. As the consuming data processing unit finishes the decoding of each frame of data it signals this back to the output DMA unit which in turn signals this to the initial host processor. The host processor can continue to send commands 50 to the consuming data processing unit to decode further frames of data. At a point 52, the controlling host processor may decide that processing should be stopped and accordingly send a command to switch the input DMA unit to a non-continuous mode of operation in which it will accept a currently pending frame of data being transferred but will not accept further frames of data and will store the currently pending frame into a spill region as necessary. The host processor will then trigger a save of state within the local FIFO memory from this known condition including a saving of any spill data such that the processing may subsequently be restarted without a loss of data.

Figure 5:
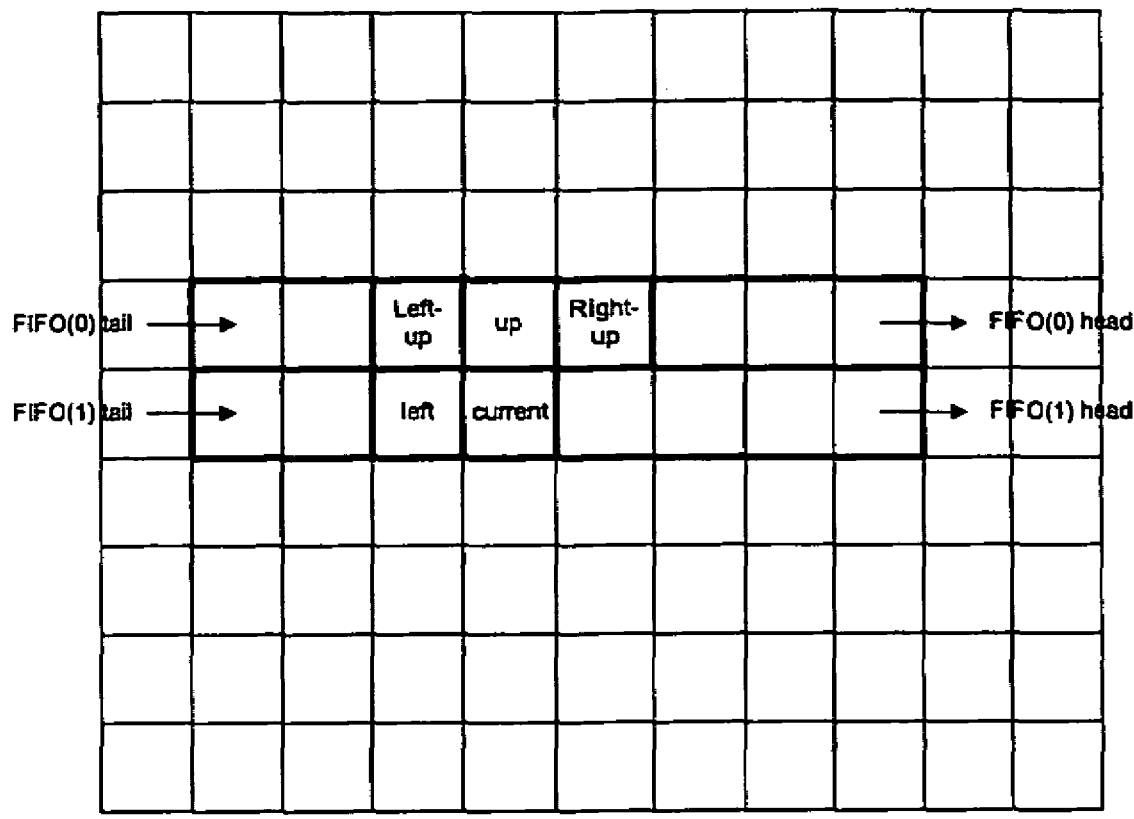
FIG. 5 illustrates the processing of a stream of video data using two local FIFO memories.
Figure 5:
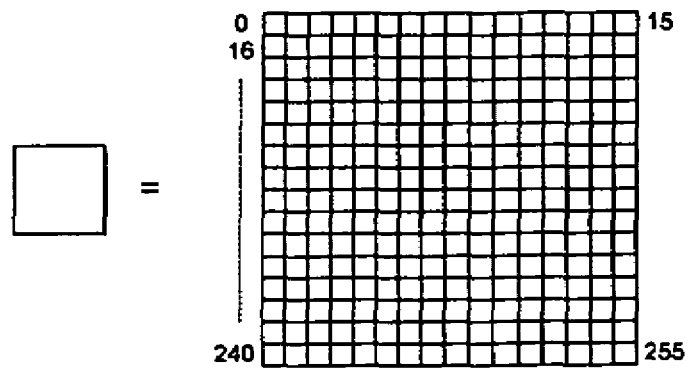

FIG. 5 schematically illustrates processing of a stream of two-dimensional video data using multiple local FIFO memories 34, 36. As will be seen, the stream of source data may be large compared to a currently active area which needs to be processed at any given time. Thus, instead of having to store the entire image and only process a small portion of this at any given time, the local FIFO memories 34, 36 can each store sections of two adjacent video lines containing the areas of the image which need to be accessed together to perform the required processing, such as filtering, decoding, encoding, compression and/or decompression. Each of these two local FIFO memories 34, 36 has an associated local head address and local tail address which may or may not advance in unison. For example when both data streams are provided by DMA, the head pointers will advance at the same pace, however when one or both of the FIFO's are fed by asynchronous processes, they may advance in a much less regular fashion. Since the controllers in FIG. 1: 10 and FIG. 2: 20 perform address translation and thus protect out-of-FIFO access, a request on any not yet available data will automatically stall the requesting processor, until the input process has kept up again (see FIGS. 6 and 7 below). In this particular scenario it is particularly advantageous when the data in the FIFOs can be accessed in random order. These two local FIFO memories 34, 36 may be provided as different regions within the same local RAM memory 4 or alternatively may be provided within separate local RAM memories. The two local FIFO memories 34, 36 when provided within a single local RAM may be contiguous or non-contiguous.

Figure 6:
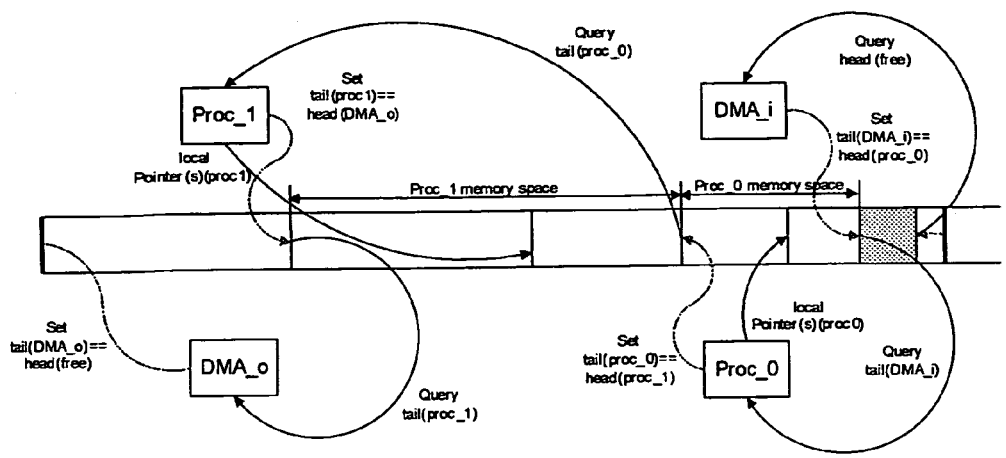
FIG. 6 illustrates the synchronization between multiple asynchronous processes which exchange data through the FIFO.

FIG. 6 illustrates the shared use of a single SW mapped FIFO by two DMA 10 and two data computation processes. Each process maintains a single state variable: Its tail pointer. For random access it can deploy an arbitrary number of intermediate points, which can only access between its own tail pointer and the head pointer, which is the previous process's tail pointer. The "in-bound" property of a single pointer between a head and tail pointer can be determined unambiguously in a circular buffer. Source data values may be read from the local FIFO memory 2, 34, 36 in a random order as required in accordance with the processing algorithm being performed. This is an advantage over a normal FIFO memory in which it is generally not possible to read out data within the middle of the memory. As well as reading source data values from any position without consuming those data values, a separate mode of operation of the bitstream unit 28 may be to read data values from the tail and consume those data values such that the tail pointer advances. Advancing the tail pointer in this way creates free space, such as by a corresponding move of the tail pointer 44 defining the spill region in turn allowing the local head pointer 40 to be advanced and new source data to be written into the local FIFO memory 2, 34, 36. In FIG. 6 a single FIFO instance is shared between multiple processors as users (four if the DMAs are treated is independent processors). Thus, within the FIFO there are effectively a plurality of local head and tail pointers.

Figure 7:
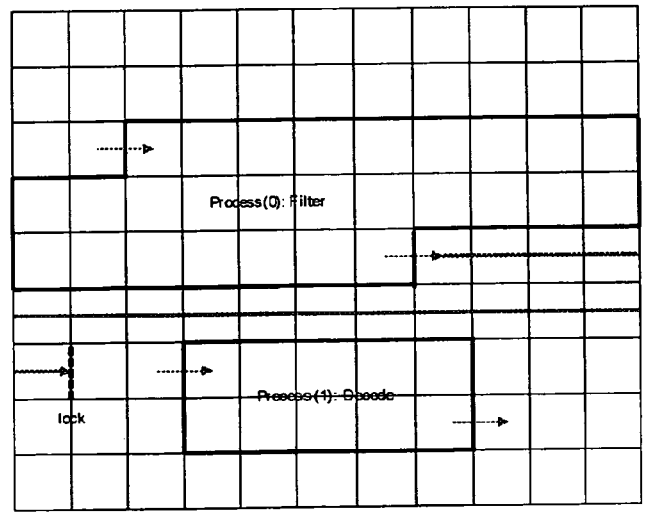
FIG. 7 illustrates the sequencing of an example video processing application, with a decode process followed by a filter process.
Figure 7:
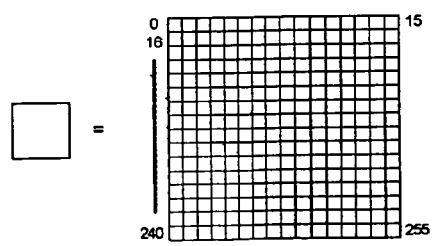

FIG. 7 illustrates the automatic process synchronisation that results from the above described management. Process 0 can lag process 1, as such the progress of process 1 is not impeded, however, since process 0 depends on the output of process, it can never pass process 1, "process 0 will bump into the tail of process 1", here indicated by the tail pointer "lock".

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for controlling transfer and storage of data, said apparatus comprising:

a streaming interface to a source of data values to be processed, said data values being ordered in accordance with a predetermined source data sequence and having respective associated source addresses in a source data linear address map;

a local FIFO memory coupled to said source and operable to store a set of data values corresponding to data values from said source and extending within said local FIFO memory from a local head address to a local tail address;

a data processing unit, coupled to said local FIFO memory, configured to issue an access request to a target data value stored at a source address within said source, wherein if said target data value is within said set of data values stored within said local FIFO memory, then said target data value is accessed by said data processing unit from said local FIFO memory rather than said source; and a memory controller coupled to said source and said local FIFO memory and operable asynchronously with accesses by said data processing unit to said local FIFO memory and configured to change at least said local head address to trigger movement of data values between said source and said local FIFO memory so as to provide storage within said local FIFO memory of data values to be accessed by said data processing unit.

2. Apparatus as claimed in claim 1, further comprising a local controller coupled to said data processing unit, said local controller allowing run-time definition of the size of the local FIFO memory within a larger local memory associated with said data processing unit, said local controller reacting in a programmable fashion when the target data value stored at the requested source address is not represented within the said local FIFO memory such that a software process execution on said data processing unit modifies the local tail address.

3. Apparatus as claimed in claim 2, further comprising an external interface to the said local controller, said external interface allowing an external process to query the status of said local FIFO memory as provided between said local head address and said local tail address, thus allowing an asynchronous external process to execute and synchronise itself with respect to the execution of the data processing unit through the locally controller status of the local tail address.

4. Apparatus as claimed in claim 1, wherein a direct memory access unit is coupled to said local memory controller and is operable to accept said data values from said source and move said data values to said local FIFO memory.

5. Apparatus as claimed in claim 1, comprising a plurality of local FIFO memories each storing a respective set of data values with a corresponding local head address and local tail address.

6. Apparatus as claimed in claim 1, wherein said local FIFO memory is shared by a plurality of data processing units, each of said data processing units accessing data values within said local FIFO memory stored at positions between respective tail and head pointers defining abutting regions within said local FIFO memory.

7. Apparatus as claimed in claim 1, wherein said local FIFO memory is part of a local RAM memory and is also operable to store further data values independent of said set of data values.

8. Apparatus as claimed in claim 7, wherein said set of data values is stored within a first contiguous region of said local RAM memory and said further data values are stored within one or more further regions of said local RAM memory.

9. Apparatus as claimed in claim 8, wherein one or more boundaries between said first contiguous region and said one or more further regions have programmable positions such that said first memory region and said one or more further memory regions can be varied in size so as to programmably partition said local RAM memory.

10. Apparatus as claimed in claim 7, comprising an arbiter operable to arbitrate between memory accesses to data values within said set of data values and memory accesses to said further data values.

11. Apparatus as claimed in claim 1, wherein said local FIFO memory stores said set of data values as a circular buffer and, as at least one of said local head address and said local tail address changes associated with movement of data values between said source and said local FIFO memory, data values remaining within said local FIFO memory are not moved within said local FIFO memory.

12. Apparatus as claimed in claim 1, wherein said local memory controller comprises programmable registers storing said local head address and said local tail address.

13. Apparatus as claimed in claim 12, wherein said local tail address is set by said data processing unit writing to said programmable registers within said local memory controller.

14. Apparatus as claimed in claim 1, further comprising a streaming interface to a sink of data values that have been processed, said data values being ordered in accordance with a predetermined sink data sequence and having respective associated sink addresses in a sink data linear address map.

15. Apparatus as claimed in claim 14, wherein a local write back tail address is associated with said set of data values and said local memory controller is responsive to a change in said local write back tail address to write back data values being evicted from said local FIFO memory to said sink.

16. Apparatus as claimed in claim 14, wherein said source and said sink are a common memory.

17. Apparatus as claimed in claim 1, wherein advancing said local head address triggers storage of data values from said source to said local FIFO memory.

18. Apparatus as claimed in claim 1, wherein advancing of said local tail address frees storage within said local FIFO memory for data values from said source.

19. Apparatus as claimed in claim 1, wherein data values being added to said set of data values stored within said local FIFO memory are copied from said source to corresponding memory locations within said local FIFO memory.

20. Apparatus as claimed in claim 1, wherein an overflow from said set of data values within said local FIFO memory is stored within a spill memory area of said local FIFO memory under control of said local memory controller, said spill memory area being between said local tail pointer and a further tail pointer, said local tail pointer and said further tail pointer being moved in unison.

21. Apparatus as claimed in claim 1, wherein a data value access by said data processing unit resulting in an underflow in said set of data values within said local FIFO memory stalls said data processing unit.

22. Apparatus as claimed in claim 1, wherein said data processing unit is also operable such that a data value read from said set of data values is removed from said local FIFO memory.

23. Apparatus as claimed in claim 1, comprising a further data processing unit operable to access said data values within said local FIFO memory such that said data processing unit and said further data processing unit communicate via said local FIFO memory.

24. Apparatus as claimed in claim 1, wherein said data processing unit is operable to perform at least one data processing operation upon a given data value within said local FIFO memory in dependence upon one or more further data values stored within said local FIFO memory at memory addresses between said local head address and said local tail address.

25. Apparatus as claimed in claim 1, wherein said data values comprise audio data values.

26. Apparatus as claimed in claim 25, wherein said data processing unit performs upon said audio data one or more of:
   a filtering operation;
   a decoding operation;
   an encoding operation;
   a compression operation; and
   a decompression operation.

27. Apparatus as claimed in claim 1, wherein said data values comprise video data values.

28. Apparatus as claimed in claim 27, wherein said data processing unit performs upon said video data one or more of:
   a filtering operation;
   a decoding operation;
   an encoding operation;
   a compression operation; and
   a decompression operation.

* * * * *